United States Patent
Birman et al.

(10) Patent No.: US 9,664,086 B2
(45) Date of Patent: May 30, 2017

(54) HEATABLE FLUID LINE

(71) Applicant: NORMA GERMANY GMBH, Maintal (DE)

(72) Inventors: Ervin Birman, Subotica (RS); Carsten Eckardt, Bruchkoebel (DE); Stephan Mann, Biebergemuend (DE)

(73) Assignee: NORMA GERMANY GMBH, Maintal (DE)

(*) Notice: Subject to any disclaimer, the term of this patent is extended or adjusted under 35 U.S.C. 154(b) by 177 days.

(21) Appl. No.: 14/579,301

(22) Filed: Dec. 22, 2014

(65) Prior Publication Data
US 2015/0240693 A1 Aug. 27, 2015

(30) Foreign Application Priority Data

Feb. 24, 2014 (DE) .......................... 10 2014 102 357

(51) Int. Cl.
*F24H 1/10* (2006.01)
*F27B 14/00* (2006.01)
(Continued)

(52) U.S. Cl.
CPC ......... *F01N 3/2896* (2013.01); *F01N 3/2066* (2013.01); *F16L 53/008* (2013.01);
(Continued)

(58) Field of Classification Search
None
See application file for complete search history.

(56) References Cited

U.S. PATENT DOCUMENTS 1,902,877 A * 3/1933 Baker .................... F24H 1/102
  392/485
3,354,294 A * 11/1967 Kollar .................... H05B 3/06
  174/650

(Continued)

FOREIGN PATENT DOCUMENTS

CN   101329004   12/2008
CN   102788220   11/2012
(Continued)

OTHER PUBLICATIONS

Russian Decision to Grant a Patent for Invention Conducted in Counterpart Russia Appln. No. 2014153265/06(055116) (Jan. 14, 2016) (w/English Language Translation).
(Continued)

*Primary Examiner* — Thor Campbell
(74) *Attorney, Agent, or Firm* — Greenblum & Bernstein, P.L.C.

(57) ABSTRACT

A heatable fluid line is disclosed having a tube, a connector that comprises a housing which is arranged at an end of the tube, and a heating rod that is arranged in the interior of the tube and enters into the housing through an inlet channel having a longitudinal axis and exits out of the housing through an opening arranged in a neck, wherein a seal is arranged in the neck, which seal surrounds the heating rod and is held in the neck by a plug (21).
The object is to be able to achieve a reliable assembly in a simple manner.
For this purpose, it is provided that the plug (21) comprises at least two parts (22, 23) which are connected to one another by an articulation section (24) having an articulation axis.

10 Claims, 2 Drawing Sheets

(51) Int. Cl.
*F01N 3/28* (2006.01)
*F16L 53/00* (2006.01)
*F01N 3/20* (2006.01)
*F16L 25/01* (2006.01)

(52) U.S. Cl.
CPC .......... *F24H 1/102* (2013.01); *F01N 2610/02* (2013.01); *F01N 2610/10* (2013.01); *F01N 2610/14* (2013.01); *F16L 25/01* (2013.01); *Y02T 10/24* (2013.01)

(56) References Cited

U.S. PATENT DOCUMENTS

| | | | | |
|---|---|---|---|---|
| 3,667,783 | A | | 6/1972 | Sotolongo |
| 3,754,118 | A | * | 8/1973 | Booker ............... H05B 3/82 138/89 |
| 3,899,658 | A | * | 8/1975 | Yartz ............... H05B 3/06 174/78 |
| 4,044,225 | A | * | 8/1977 | Pease ............... H05B 3/06 219/536 |
| 4,099,319 | A | * | 7/1978 | Vogel ............... H05B 3/04 219/536 |
| 4,124,039 | A | * | 11/1978 | St. Laurent .......... F16L 53/002 138/35 |
| 4,241,291 | A | * | 12/1980 | Carnes ............... F24C 7/06 219/523 |
| 4,423,311 | A | * | 12/1983 | Varney, Sr. ........... E03B 7/14 138/33 |
| 4,910,865 | A | * | 3/1990 | Houle ............... C23F 13/02 204/196.16 |
| 4,917,539 | A | * | 4/1990 | de la Salle .......... F16L 41/06 137/318 |
| 5,182,792 | A | * | 1/1993 | Goncalves .......... E21B 17/203 166/60 |
| 5,640,951 | A | * | 6/1997 | Huddart ............. A61M 16/08 128/203.26 |
| 5,859,953 | A | * | 1/1999 | Nickless ........... F16L 53/008 138/33 |
| 5,872,890 | A | * | 2/1999 | LaCombe ........... F24H 1/102 392/487 |
| 6,456,785 | B1 | * | 9/2002 | Evans ............... F24H 1/102 392/448 |
| 6,914,190 | B2 | * | 7/2005 | Dunand ............ H02G 3/0468 174/71 R |
| 7,162,149 | B2 | * | 1/2007 | Evans ............... F22B 1/282 392/386 |
| 7,424,211 | B2 | * | 9/2008 | Lehmann ............ F01M 5/001 392/314 |
| 7,721,766 | B2 | * | 5/2010 | Sawada ............... H05B 3/58 138/121 |
| 8,028,721 | B2 | * | 10/2011 | Koskey, Jr. .......... F16L 53/008 138/32 |
| 8,180,207 | B2 | * | 5/2012 | Shirai ............... E03D 9/08 392/465 |
| 8,238,733 | B2 | * | 8/2012 | Sawada ............. F16L 53/008 138/33 |
| 8,291,939 | B2 | * | 10/2012 | Ferrone ............. A01K 7/027 138/104 |
| 9,433,344 | B2 | * | 9/2016 | Avitsian ............. A61B 1/126 |
| 2008/0028512 | A1 | * | 2/2008 | Hughson ........... F24H 9/2028 4/541.3 |
| 2008/0271801 | A1 | * | 11/2008 | Sonderegger ........ H05B 3/58 138/33 |
| 2008/0317450 | A1 | | 12/2008 | Sawada |
| 2009/0266435 | A1 | * | 10/2009 | Ferrone ............. A01K 7/027 138/33 |
| 2011/0006513 | A1 | | 1/2011 | Lechner et al. |
| 2012/0141100 | A1 | * | 6/2012 | Evans ............... F24H 1/142 392/485 |
| 2012/0291904 | A1 | | 11/2012 | Eckhardt et al. |

FOREIGN PATENT DOCUMENTS

| | | |
|---|---|---|
| DE | 10 2011 102 151 | 11/2012 |
| EP | 1 070 642 | 1/2001 |
| EP | 2 006 593 | 12/2008 |
| JP | 2009-002424 | 1/2009 |
| KR | 10-2012-0121540 | 11/2012 |
| KR | 10-2012-0130046 | 11/2012 |
| RU | 55082 | 7/2006 |
| RU | 2300043 | 5/2007 |
| SU | 1571352 | 6/1990 |

OTHER PUBLICATIONS

Korean Office Action Conducted in Counterpart Korea Appln. No. 10-2015-0018831 (Mar. 4, 2016) (w/English Language Translation).

China Office Action Conducted in Counterpart China Appln. No. 201510042021.4 (May 31, 2016) (w/ English Language Translation).

European Office Action in Counterpart European Appln. No. 14199759.3-1754 (Jul. 3, 2015) (w/English Language Translation).

* cited by examiner

HEATABLE FLUID LINE

CROSS-REFERENCE TO RELATED APPLICATIONS

The present application claims priority under 35 U.S.C. §119(a) of German Patent Application No. 10 2014 102 357.9 filed Feb. 24, 2014, the disclosure of which is expressly incorporated by reference herein in its entirety.

The invention relates to a heatable fluid line having a tube, a connector that comprises a housing which is arranged at an end of the tube, and a heating rod that is arranged in the interior of the tube and enters into the housing through an inlet channel having a longitudinal axis and exits out of the housing through an outlet channel arranged in a neck, wherein a seal is arranged in the neck, which seal surrounds the heating rod and is held in the neck by a plug.

A heatable fluid line of this type is known from DE 10 2011 102 151 A1, for example.

The invention is described below on the basis of a fluid line that is used in a motor vehicle to transport urea from a tank to a point of use. Urea is used in diesel engines in order to reduce nitrogen oxides.

At low outside temperatures below −11° C., there is the risk of the urea freezing in the fluid line and a transport of the urea through the line thus no longer being possible. In the case of other fluids, the freezing points may have different values. In any case, if the fluid freezes, a transport of the fluid through the fluid line is no longer possible.

Therefore, the use of a heating rod to heat the fluid line and the connector was proposed in the above referenced DE 10 2011 102 151 A1. This heating rod is arranged in the interior of the tube so that the entire heating energy can be transferred to the fluid in the interior of the tube and the energy losses are thus relatively low. However, the heating rod must be supplied with electric energy. For this purpose, the heating rod is guided out of the connector.

The opening through which the heating rod is guided out of the connector must be sealed, in order to prevent a leakage of the fluid out of the line to the outside. For this purpose, the seal is provided which can essentially be embodied simply as an O-ring. The plug is provided to hold this seal in position even during larger pressures in the interior of the tube. The plug is pressed into the neck. To achieve an improved retaining force, the plug is locked to the neck. To do this, however, a relatively large pressing force is necessary.

The object of the invention is to achieve a reliable assembly in a simple manner.

This object is attained for a heatable fluid line of the type named at the outset in that the plug comprises two parts which are connected to one another by an articulation section having an articulation axis.

Assembly is simplified by the shape of the plug. The two parts of the plug respectively have, at least outside the articulation section, a certain distance to one another and can be moved towards one another accordingly. Thus, the outer circumference is slightly reduced so that the plug can be more easily inserted into the neck.

Here, it is preferred that the articulation section is formed by a bridge which is embodied as a single piece with the parts of the plug. This simplifies production. The plug can be embodied as a single piece overall, for example, by injection molding. The bridge has an extension that is significantly smaller than the height of the plug. For example, the bridge has an extension in the height direction which is maximally equal to a third or even only a fourth of the height of the plug. A bridge of this type then allows the tilting of the parts of the plug relative to one another.

Preferably, the plug is welded to the heating rod. When the plug has been inserted into the neck, it can be welded to the heating rod, preferably by means of an ultrasound welding. Through the welding, it is prevented that the parts of the plug can once again move towards one another, so that the plug is captively held in the neck after the welding.

Preferably, the neck comprises two opposing welding approach zones and the articulation axis runs parallel to a connection between the welding approach zones. A welding approach zone is a region on the outside of the neck on which a sonode can be positioned during an ultrasound welding. The two welding approach zones thus define a welding direction, that is, the direction in which the welding energy is introduced into the plug. If the articulation axis runs parallel to this direction, then no vibration occurs about the articulation axis during the welding. The entire welding energy travels only through the material of the plug. The heating rod itself is not included in the "welding beam," so that the risk of damage to the heating wires in the heating rod is virtually eliminated.

Preferably, the welding approach zones are arranged on both sides of the longitudinal axis. Here, sufficient space is available to position sonodes during an ultrasound welding, for example.

Preferably, the plug comprises centering projections and the articulation axis runs between the centering projections. The centering projections are used to insert the plug into the neck in a predetermined alignment. With the centering projections, it can be achieved that the articulation axis has precisely the orientation that is desired for the weld joint.

Preferably, the plug has a pass-through channel through which the heating rod is guided, wherein projections pointing radially inwards are arranged in the pass-through channel. If the plug is inserted into the neck, then the parts of the plug can be moved towards one another slightly, even though the heating rod is already guided through the pass-through channel. When pressed together, the projections can yield slightly and/or can press into the heating rod. However, a welding of the plug to the heating rod can then occur at the projections.

Here, it is preferred that the projections have on their radial inside a smaller extension in a circumferential direction than on their radial outside. In other words, the projections taper inwards. A relatively small contact surface thus results between the projections and the outside of the heating rod. Since the welding energy is then concentrated at these small projections, a welding of the plug to the heating rod can be achieved with relatively little welding energy.

Here it is preferred that, in at least one part, at least two projections are provided which are arranged at a distance of at least 120° in a circumferential direction. In at least one part, but preferably in the two parts of the plug, projections are then arranged in a virtually diametrically opposed manner. The projections are then positioned one after another in the welding direction, so that an excellent welding result can be obtained with relatively little welding energy.

Preferably, a clear space is provided between the parts, which space is at least partially arranged in the neck. This clear space has two functions. During the assembly of the plug in the neck, it allows the parts of the plug to be moved towards one another, in order to facilitate the insertion. When the plug is inserted into the neck and the welding process begins, the clear space is then provided in order to form a pocket or an accommodation space in which fused material can be accommodated.

The invention is described below on the basis of a preferred exemplary embodiment in connection with the drawing. Wherein.

Figure 1:
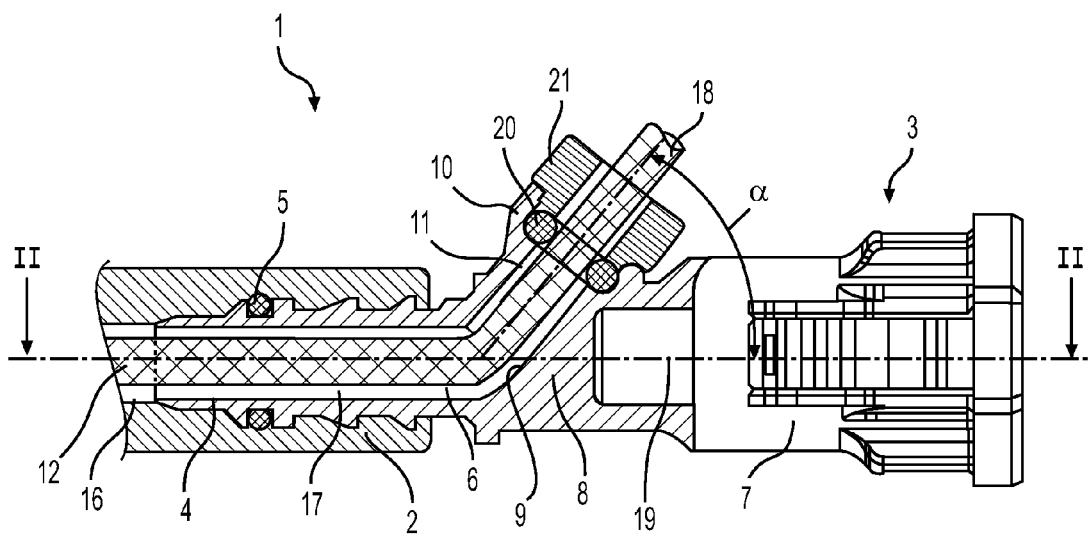
FIG. 1 shows an exemplary embodiment of a fluid line with a connector.

FIG. 1 shows a fluid line 1 having a tube 2 and a connector 3. The connector 3 comprises a connecting piece 4, onto which the tube 2 is slid. The connecting piece 4 has a "fir tree" geometry. By means not illustrated in greater detail, the tube 2 can be attached to the connecting piece 4. For example, the tube 2 can be molded-in in the region of the connecting piece 4 using a casting compound so that it can no longer radially expand. In addition, a sealing ring 5 is provided between the tube 2 and the connecting piece 4.

The tube 2 is formed from a plastic. It is flexible. It can also be embodied in the form of a hose.

In the present exemplary embodiment, the connector 3 comprises an inlet channel 6 running in a straight line, which channel passes through the connecting piece 4 and is guided up to a connection geometry 7, with the aid of which the connector 3 can be attached to connecting piece of a tank, pump or another connector. The exact embodiment of the connection geometry 7 does not play a role in the present case. However, it is embodied in such a manner that it can enable a mechanically stable and fluid-tight connection.

In the inlet channel 6, a ramp element 8 is arranged which comprises a guide surface 9. The connector 3 comprises a neck 10 which forms an opening 11.

In the tube 2, a heating element is arranged in the form of a heating rod 12. The heating rod 12 is formed from a plastic 13 in which two heating conductors 14, 15 (FIG. 3) are arranged. The heating rod 12 is bendable. The heating conductors 14, 15 are accommodated in the interior of the heating rod 12 in a mechanically protected manner.

Between the heating rod 12 and the tube 2, an interior space 16 is formed through which a fluid can flow. An interior space 17 is also formed between the connecting piece 4 and the heating rod 12.

If the heating rod 12 is slid into the connecting piece 4, then a tip 18 moves onto the guide surface 9 and is deflected by the guide surface 9 of the ramp element 8, namely into the neck 10 in the direction of the opening 11. If the heating rod 12 is slid further, then it exits out of the neck 10 through the opening 11. The neck 10 is positioned at an angle α to the longitudinal axis 19 of the inlet channel 6. This angle preferably lies within the range of 20° to 80°.

In the opening 11, a ring seal 20 is arranged between the inner wall of the neck 10 and the heating conductor 12. The ring seal 20 bears in a radially outward sealing manner against the inside of the neck 10 and in a radially inward sealing manner against the heating rod 12. The ring seal 20 is fitted onto the heating rod 12 when the rod has exited the opening 11 and is then inserted into the opening 11. The ring seal 20 can thereby be slightly compressed radially inwards and radially outwards.

In the interior of the fluid line 1, an increased pressure of 6 bar, for example, can occur. With a pressure of this type, there is the risk of the ring seal 20 being pressed out of the opening 11. To prevent this, a plug 21 is inserted in the neck 10, which plug secures the ring seal 20, which can be embodied as an O-ring, in the connector 3. The plug 21 is illustrated in a top view in FIG. 3 and illustrated in an enlarged perspective in FIG. 4.

In place of a connector having a pass-through channel running in a straight line, a connector having a pass-through channel diverted by 90° is of course also possible.

Figure 3:
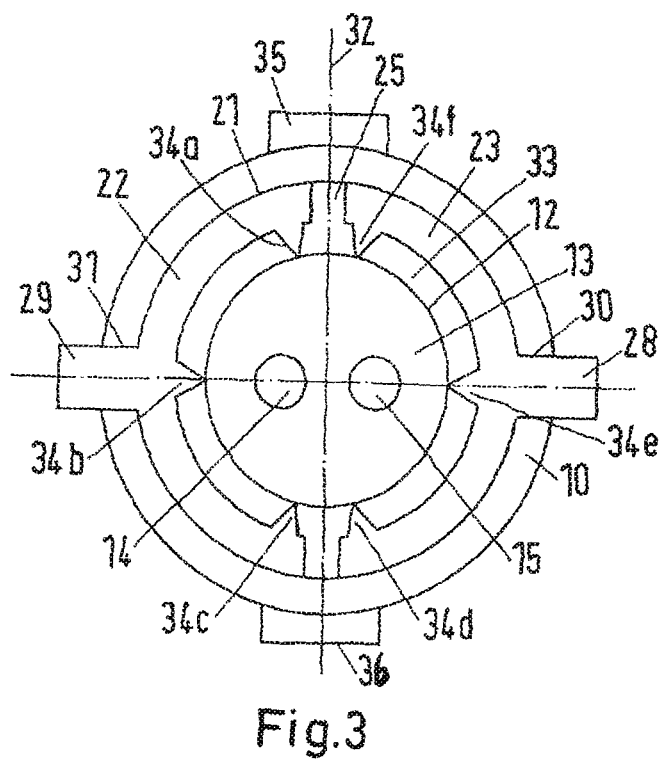
FIG. 3 shows a top view of a neck with a plug and heating rod.
Figure 4:
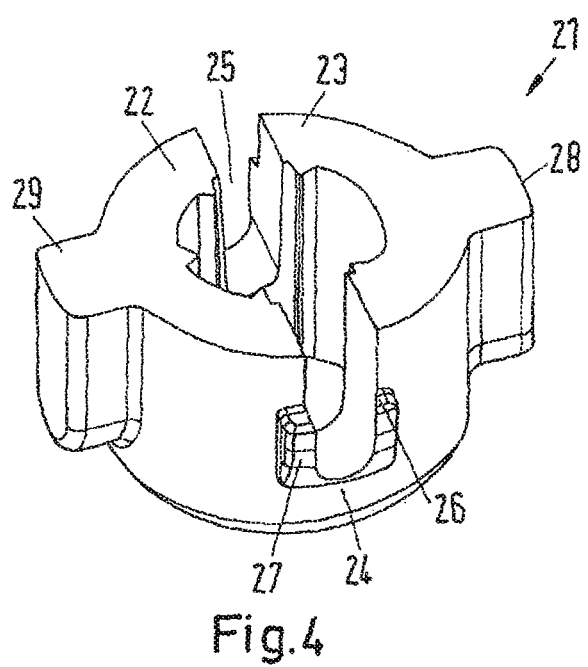
FIG. 4 shows a perspective representation of a plug.

The plug 21 comprises two parts 22, 23 which are connected to one another by an articulation section embodied as a bridge 24 (FIGS. 3 and 4). Apart from this, the two parts 22, 23 are separated from one another by a clear space 25. The two parts 22, 23 can thus be tilted towards one another in the region of the clear space 25. Accordingly, the articulation section has an articulation axis 32, which in the present case lies on a plane that roughly centrally divides the clear space 25.

On both sides of the clear space 25, locking projections 26, 27 are provided, with which the plug 21 can be fixed in the neck 10 in a locking manner. The clear space 25 can completely or partially extend through the locking projections 26, 27. Furthermore, the plug 21 comprises centering projections 28, 29 that can enter into slots 30, 31 which are embodied in the neck 10. FIG. 3 shows, illustrated by a dot-dashed line, the articulation axis 32 that runs between the centering projections 28, 29.

The plug 21 comprises a pass-through channel 33, through which the heating rod 12 is guided. Multiple projections 34a-34f pointing radially inwards are arranged in the pass-through channel. These projections 34a-34f taper radially inwards, that is, they have on their radial inside a smaller extension in a circumferential direction than on their radial outside. Each of the two parts 22, 23 comprises two projections 34a, 34c; 34d, 34f, which are respectively arranged at a distance of at least 120° in a circumferential direction. In other words: These projections 34a, 34c; 34d, 34f are positioned diametrically opposed to one another.

On its outside, the neck 10 has welding approach zones 35, 36 which in the present exemplary embodiment have flat support surfaces for a sonode of an ultrasound welding device. However, depending on the shape of the sonodes, the welding approach zones 35, 36 can also have different shapes.

Figure 2:
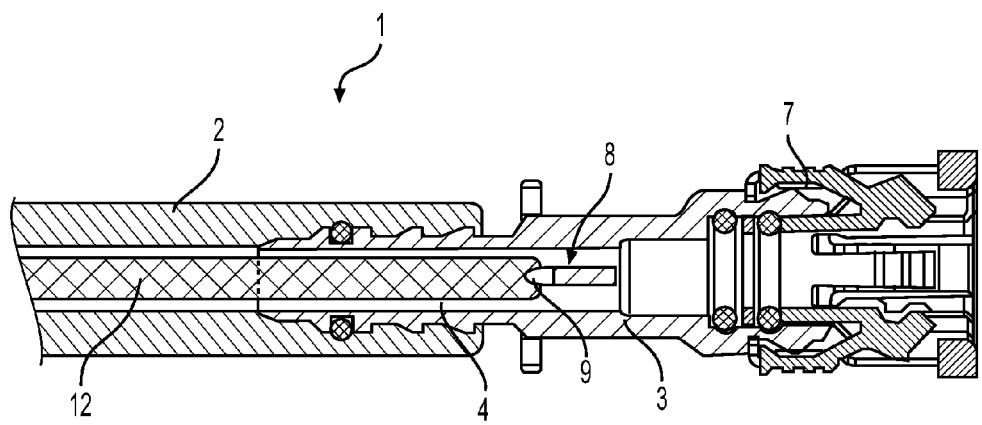
FIG. 2 shows a section of II-II according to FIG. 1.

It can be seen in FIG. 3 that the articulation axis 32 runs parallel to a connection between the welding approach zones 35, 36. The welding approach zones 35, 36 are arranged on both sides of the longitudinal axis 19, that is, perpendicular to the plane of the drawing in reference to FIG. 1 and on the top and bottom in reference to the illustration in FIG. 2 (not shown in FIG. 2 because of the sectional view). The articulation axis 32 thus runs parallel to the welding direction. In this case, the entire welding energy travels only through the material of the plug 21 during the ultrasound welding. A vibration about the articulation axis 32 does not occur. The plug 21 is sufficiently welded to the heating rod 12 via the projections 34a-34f. Since the projections 34a-34f taper radially inwards in a sharp-edged or pointed manner, there results a concentration of the welding energy at these tips. In addition, the tips have the advantage that they simplify the assembly of the plug. When the two parts 22, 23 are pressed together, the tips of the projections 34a-34f can yield slightly or press slightly into the heating rod 12.

The heating rod 12 is not included in the "welding beam," so that the risk of damage to the heating wires 14, 15 in the heating rod 12 is no longer present.

The alignment of the articulation axis 32 parallel to the "welding beam" has the additional advantage that the clear space 25 forms a pocket or an accommodation space in which the fused material can be accommodated.

The invention claimed is:

1. A heatable fluid line comprising:
   a tube;

a connector comprising a housing arranged at an end of the tube;

a heating rod arranged in an interior of the tube to enter into the housing through an inlet channel having a longitudinal axis and to exit out of the housing through an opening arranged in a neck; and a seal, which is arranged in the neck to surround the heating rod, is held in the neck by a plug, that comprises at least two parts that are connected to one another by an articulation section having an articulation axis, wherein the plug is welded to the heating rod.

2. Fluid line according to claim 1, wherein the articulation section is formed by a bridge which is connected to the parts of the plug as a single piece.

3. Fluid line according to claim 1, wherein the neck comprises two opposing welding approach zones and the articulation axis runs parallel to a connection between the welding approach zones.

4. Fluid line according to claim 1, wherein the welding approach zones are arranged on both sides of the longitudinal axis.

5. Fluid line according to claim 1, wherein the plug comprises centering projections and the articulation axis runs between the centering projections.

6. Fluid line according to claim 1, wherein the plug comprises a pass-through channel, through which the heating rod is guided, wherein projections pointing radially inwards are arranged in the pass-through channel.

7. Fluid line according to claim 6, wherein the projections have on their radial inside a smaller extension in a circumferential direction than on their radial outside.

8. Fluid line according to claim 6, wherein, in at least one part, at least two projections are provided which are arranged at a distance of at least 120° in a circumferential direction.

9. Fluid line according to claim 1, wherein, between the parts, a clear space is provided which at is at least partially arranged in the neck.

10. A heatable fluid line comprising:

a tube;

a connector comprising a housing arranged at an end of the tube;

a heating rod-arranged in an interior of the tube to enter into the housing through an inlet channel having a longitudinal axis and to exit out of the housing through an opening arranged in a neck; and a seal, which is arranged in the neck to surround the heating rod, is held in the neckya plug that comprises at least two parts connected to one another by an articulation section having an articulation axis, wherein the plum further comprises a pass-through channel, through which the heating rod is guided, wherein projections, which are arranged in the pass-through opening to point radially inwards, have on their radial insides a smaller extension in a circumferential direct on their radial outsides.

* * * * *